UNITED STATES PATENT OFFICE.

DAVID CHALLINOR, OF PITTSBURG, PENNSYLVANIA.

MANUFACTURE OF VARIEGATED GLASSWARE.

SPECIFICATION forming part of Letters Patent No. 342,898, dated June 1, 1886.

Application filed March 24, 1886. Serial No. 196,398. (Specimens.)

*To all whom it may concern:*

Be it known that I, DAVID CHALLINOR, residing at Pittsburg, in the county of Allegheny and State of Pennsylvania, a citizen of the United States, have invented or discovered certain new and useful Improvements in the Manufacture of Variegated Glassware, of which improvements the following is a specification.

Variegated glassware has been heretofore manufactured by gathering a quantity of various-colored glasses upon a blow-pipe, then mixing such colored glasses together by stirring or twisting them together, and finally blowing the mixed or mingled glasses in a suitable mold. This method is objectionable, as one or more of the glasses gathered may be colder than the others, and will not therefore readily commingle with the others, and, further, it is difficult to thoroughly mix or mingle the glasses while collected in a ball in the blow-pipe.

The object of the invention is to provide for a mixing or commingling of the glasses while at a uniform temperature and under such conditions that the glasses may be easily and thoroughly stirred together, thus producing a uniformity of structure throughout the completed article, the colors of the various glasses gradually merging one into the other; and to this end the invention consists in the method substantially as hereinafter described and claimed.

In carrying out my invention glasses of several colors are prepared in any suitable manner in different pots or tanks, and as soon as such glasses are in the proper state or condition a suitable quantity of each kind or color is then placed in a crucible or pot, and there thoroughly stirred together and intermingled. The pot or crucible, with the mixed glasses, is then heated to the proper working temperature, being dependent upon the article to be made, and the manner of making. Articles are then formed of these mixed glasses in any of the usual ways—as, for example, by blowing or casting.

This method of mixing the glasses while in a molten or thoroughly-plastic condition renders it possible to obtain a thorough distribution of the various colors throughout the entire mass, and under such conditions that a gradual merging of one color into another is effected.

I claim herein as my invention—

1. As an improvement in the art of producing variegated glass, the herein-described method, which consists in melting glasses of various colors in separate receptacles, putting the desired quantity of each of such glasses in a common pot or crucible, and then stirring the same together, substantially as set forth.

2. As an improvement in the art of producing variegated glass, the herein-described method, which consists in melting glasses of various colors in separate receptacles, putting the desired quantity of each of such glasses in a common pot or crucible, stirring the same together, and then heating the mingled glasses to the proper working temperature, substantially as set forth.

In testimony whereof I have hereunto set my hand.

DAVID CHALLINOR.

Witnesses:
DARWIN S. WOLCOTT,
W. B. CORWIN.